(12) United States Patent
Mooring et al.

(10) Patent No.: US 8,289,162 B2
(45) Date of Patent: Oct. 16, 2012

(54) GESTURE-BASED USER INTERFACE FOR A WEARABLE PORTABLE DEVICE

(75) Inventors: David J. Mooring, Los Altos Hills, CA (US); Alissa M. Fitzgerald, Menlo Park, CA (US)

(73) Assignee: Wimm Labs, Inc., Los Altos, CA (US)

( * ) Notice: Subject to any disclaimer, the term of this patent is extended or adjusted under 35 U.S.C. 154(b) by 947 days.

(21) Appl. No.: 12/341,631

(22) Filed: Dec. 22, 2008

(65) Prior Publication Data

US 2010/0156676 A1 Jun. 24, 2010

(51) Int. Cl.
*G08B 13/08* (2006.01)

(52) U.S. Cl. ........... 340/546; 340/407.1; 340/545.5; 340/545.2; 340/669; 341/20; 341/35; 345/156; 345/169; 345/173; 345/684; 715/863; 715/864

(58) Field of Classification Search .......... 715/863, 715/864
See application file for complete search history.

(56) References Cited

U.S. PATENT DOCUMENTS

| | | | |
|---|---|---|---|
| 4,264,969 A * | 4/1981 | Walker et al. | 368/319 |
| 5,392,261 A * | 2/1995 | Hsu | 368/281 |
| 5,657,298 A * | 8/1997 | Choay | 368/276 |
| 6,158,884 A * | 12/2000 | Lebby et al. | 368/282 |
| 6,201,484 B1 * | 3/2001 | Russell | 341/20 |
| 6,373,235 B1 * | 4/2002 | Barker | 324/76.53 |
| 6,431,746 B1 | 8/2002 | Jujo et al. | |
| 6,477,117 B1 * | 11/2002 | Narayanaswami et al. | 368/251 |
| 6,525,997 B1 * | 2/2003 | Narayanaswami et al. | 368/223 |
| 6,527,436 B1 * | 3/2003 | Ng | 368/321 |
| 6,549,791 B1 * | 4/2003 | Jeon et al. | 455/572 |
| 6,556,222 B1 * | 4/2003 | Narayanaswami | 715/786 |
| 6,570,823 B1 | 5/2003 | Gilomen et al. | |
| 6,720,860 B1 * | 4/2004 | Narayanaswami | 340/5.54 |
| 6,771,294 B1 * | 8/2004 | Pulli et al. | 715/863 |
| 7,031,922 B1 * | 4/2006 | Kalinowski et al. | 704/271 |
| 7,081,905 B1 * | 7/2006 | Raghunath | 345/684 |
| 7,180,500 B2 * | 2/2007 | Marvit et al. | 345/156 |
| 7,193,606 B2 * | 3/2007 | Barnett et al. | 345/156 |
| 7,286,063 B2 * | 10/2007 | Gauthey et al. | 341/34 |
| 7,308,112 B2 * | 12/2007 | Fujimura et al. | 382/103 |
| 7,593,000 B1 * | 9/2009 | Chin | 345/156 |
| 7,946,758 B2 * | 5/2011 | Mooring | 368/276 |

(Continued)

FOREIGN PATENT DOCUMENTS

| | | |
|---|---|---|
| GB | 2399253 | 8/2004 |
| WO | WO 2009097592 A1 * | 8/2009 |
| WO | 2010016065 A1 | 2/2010 |

OTHER PUBLICATIONS

"W100 wrist-watch mobile phone", <http://www.gizmag.com/go/7797/>, 2007.

(Continued)

*Primary Examiner* — George Bugg
*Assistant Examiner* — Paul Obiniyi
(74) *Attorney, Agent, or Firm* — Convergent Law Group LLP

(57) ABSTRACT

Methods and systems for providing a gesture-based user interface for a wearable portable device are described. A gesture including a movement of the wearable portable device is received, and at least one character associated with the gesture is identified and displayed on the wearable portable device, thereby allowing entry of characters on the user interface of the wearable portable device using the gestures.

24 Claims, 7 Drawing Sheets

U.S. PATENT DOCUMENTS

| | | | | |
|---|---|---|---|---|
| 7,979,237 | B2* | 7/2011 | Fitzgerald et al. | 702/181 |
| 2003/0026170 | A1* | 2/2003 | Yang | 368/10 |
| 2003/0151982 | A1* | 8/2003 | Brewer et al. | 368/46 |
| 2004/0057578 | A1* | 3/2004 | Brewer | 379/433.1 |
| 2004/0120224 | A1* | 6/2004 | Meylan | 368/309 |
| 2004/0178995 | A1* | 9/2004 | Sterling | 345/173 |
| 2004/0243342 | A1* | 12/2004 | Rekimoto | 702/150 |
| 2005/0216867 | A1* | 9/2005 | Marvit et al. | 715/863 |
| 2005/0271279 | A1* | 12/2005 | Fujimura et al. | 382/203 |
| 2006/0291336 | A1* | 12/2006 | Hyun | 368/282 |
| 2007/0042821 | A1* | 2/2007 | Lee et al. | 455/575.6 |
| 2007/0132722 | A1* | 6/2007 | Kim et al. | 345/156 |
| 2007/0194066 | A1* | 8/2007 | Ishihara et al. | 224/164 |
| 2007/0279852 | A1* | 12/2007 | Daniel et al. | 361/683 |
| 2008/0168366 | A1* | 7/2008 | Kocienda et al. | 715/764 |
| 2008/0170776 | A1* | 7/2008 | Albertson et al. | 382/154 |
| 2009/0077464 | A1* | 3/2009 | Goldsmith et al. | 715/257 |
| 2009/0174667 | A1* | 7/2009 | Kocienda et al. | 345/169 |
| 2009/0179867 | A1* | 7/2009 | Shim et al. | 345/173 |
| 2009/0195497 | A1* | 8/2009 | Fitzgerald et al. | 345/156 |
| 2009/0196124 | A1* | 8/2009 | Mooring | 368/204 |
| 2009/0262069 | A1* | 10/2009 | Huntington | 345/156 |
| 2009/0265669 | A1* | 10/2009 | Kida et al. | 715/863 |
| 2009/0281768 | A1* | 11/2009 | Fitzgerald et al. | 702/181 |
| 2009/0315767 | A1* | 12/2009 | Scalisi et al. | 342/357.07 |
| 2010/0083373 | A1* | 4/2010 | White et al. | 726/21 |
| 2010/0124949 | A1* | 5/2010 | Demuynck et al. | 455/569.1 |
| 2010/0127967 | A1* | 5/2010 | Graumann et al. | 345/156 |
| 2010/0156676 | A1* | 6/2010 | Mooring et al. | 341/20 |
| 2010/0257251 | A1* | 10/2010 | Mooring et al. | 709/216 |
| 2011/0176395 | A1* | 7/2011 | Mooring | 368/276 |
| 2012/0092822 | A1* | 4/2012 | Mooring et al. | 361/679.21 |

OTHER PUBLICATIONS

"iCool M700 W100 G100 Touch Screen Wrist Watch Cell Phones", <http://www.ic-mall.com/icool-m700-w100-g100-touch-screen-wrist-watch-cell-phones-p-1973.html>, 2008.

"Touchscreen Cell Phone/PDA Wristwatch", <http://www.thinkgeek.com/gadgets/cellphone/9c9d/>, 2008.

"Abacus WristPDA: a Watch Goes Where no PDA Can Go," <http://www.theinquirer.net/en/inquirer/news/2006/04/30/abacus-wristpda-a-watch-goes-where-no-pda-can-go>.

"Wrist Phone M500 Ships this Week," <http://images.google.com/imgres?imgurl=http://www.slashphone.com/media/data/800/M500.jpg&imgrefurl=http://cell-reviews.blogspot.com/2007_05_01_archive.html&h=327&w=494&sz=21&hl=en&start=11&um=1&tbnid=Nk7fR4xZXVo5CM:&tbnh=86&tbnw=130&prev=/images%3Fq%3Dwrist%2Bwatach%2Bwith%2Breplaceable%2Btouch%2Bscreen%2Bdisplay%26svnum%3D10%26um%3D1%26hl%3Den%26client%3Dfirefox-a%26channel%3Ds%26rls%3Dorg.mozilla:en-US:official%26sa%3DN>; May 31, 2007.

"Fossil Palm OS Wrist PDA on Sale for $80," http://images.google.com/imgres?imgurl=http://www.palminfocenter.com/images/fossil_abacus_wristpda.jpg&imgrefurl=http://www.palminfocenter.com/news/7992/fossil-palm-os-wrist-pda-on-sale-for-80/&h=200&w=200&sz=26&hl=en&start=148&um=1&tbnid=o8GiOmWzShovUM:&tbnh=104&tbnw=104&prev=/images%3Fq%3Dwrist%2Bwatch%2Bwith%2Breplaceable%2Btouch%2Bscreen%2Bdisplay%26start%3D140%26ndsp%3D20%26svnum%3D10%26um%3D1%26hl%3Den%26client%3Dfirefox-a%.

Youichi Horry et al., A Passive-Style Buttonless Mobile Terminal, IEEE Transactions on Consumer Electronics, Aug. 2003, p. 530, vol. 49, No. 3.

http://www.modumobile.com/modu—make new connections, pp. 1-3, 2008.

M500 User Manual, Cellwatch M500, pp. 1-48, 2007.

PCT International Search Report and Written Opinion of the International Searching Authority, issued Mar. 3, 2009, application No. PCT/US2009/030777.

* cited by examiner

GESTURE-BASED USER INTERFACE FOR A WEARABLE PORTABLE DEVICE

BACKGROUND OF THE INVENTION

Wearable devices, such as watches or other wrist-worn devices, are by their nature relatively small in size, and may be less than 40 mm in diameter. An electronic wearable portable device with multiple functions such as data display, email, text messaging, and wireless communication requires a practical means to interact intelligently with the device to input data, scroll through software menus, etc. Due to the form factor of the device, a keyboard or other button-based user interface integrated with the wearable portable device is neither practical nor aesthetically pleasing.

BRIEF SUMMARY OF THE INVENTION

Methods and systems for providing a gesture-based user interface for a wearable portable device are described. A gesture including a movement of the wearable portable device is received, and at least one character associated with the gesture is identified and displayed on the wearable portable device.

BRIEF DESCRIPTION OF SEVERAL VIEWS OF THE DRAWINGS

The drawings illustrate the design and utility of embodiments of the invention, in which similar elements are referred to by common reference numerals. In order to better appreciate the embodiments, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which.

DETAILED DESCRIPTION OF THE INVENTION

The present invention relates to providing a gesture-based user interface for a wearable portable device. The following description is presented to enable one of ordinary skill in the art to make and use the invention and is provided in the context of a patent application and its requirements. Various modifications to the embodiments and the generic principles and features described herein can be made. Thus, the present invention is not intended to be limited to the embodiments shown, but is to be accorded the widest scope consistent with the principles and features described herein.

In the following description, for purposes of explanation, numerous details are set forth in order to provide a thorough understanding of various embodiments. It is important to note that the invention can be practiced without all of these details. Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The exemplary embodiment provides methods and systems for interacting intelligently with a wearable portable device. By using at least one inertial sensor to detect different gestures, which are mapped to different predetermined functions, the user may interact intelligently with the wearable portable device. A gesture may include any human motion which results in forces sensed by the wearable portable device, including tilting, shaking, tapping, and moving, and can include more complex gestures including a plurality of different actions in pre-defined sequences. When forces are sensed by the inertial sensor, the wearable portable device may identify the gesture being performed and execute the predetermined function associated with the gesture. Predetermined functions associated with the gesture can include substantially any interaction with the user interface of the wearable portable device, including any of selecting an item on the display, scrolling a menu or a displayed screen, for example. By using such gestures as input mechanisms to execute the predetermined functions, the need for a keyboard or other button-based user interface may be eliminated.

Figure 1A:
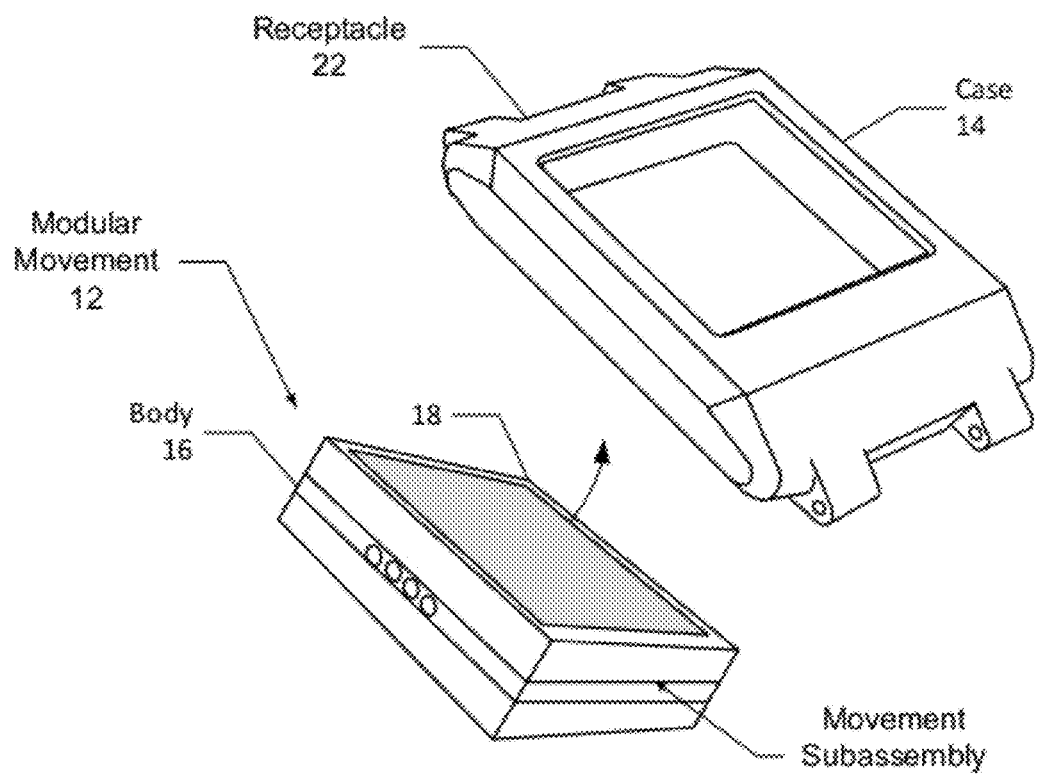
FIGS. 1A-1B are block diagrams illustrating exemplary embodiments of a wearable portable device that provides a gesture-based user interface.
Figure 1B:
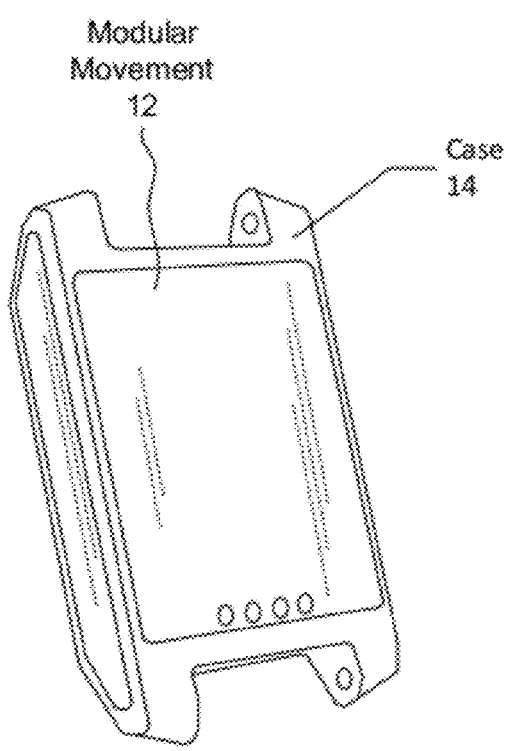
Figure 2:
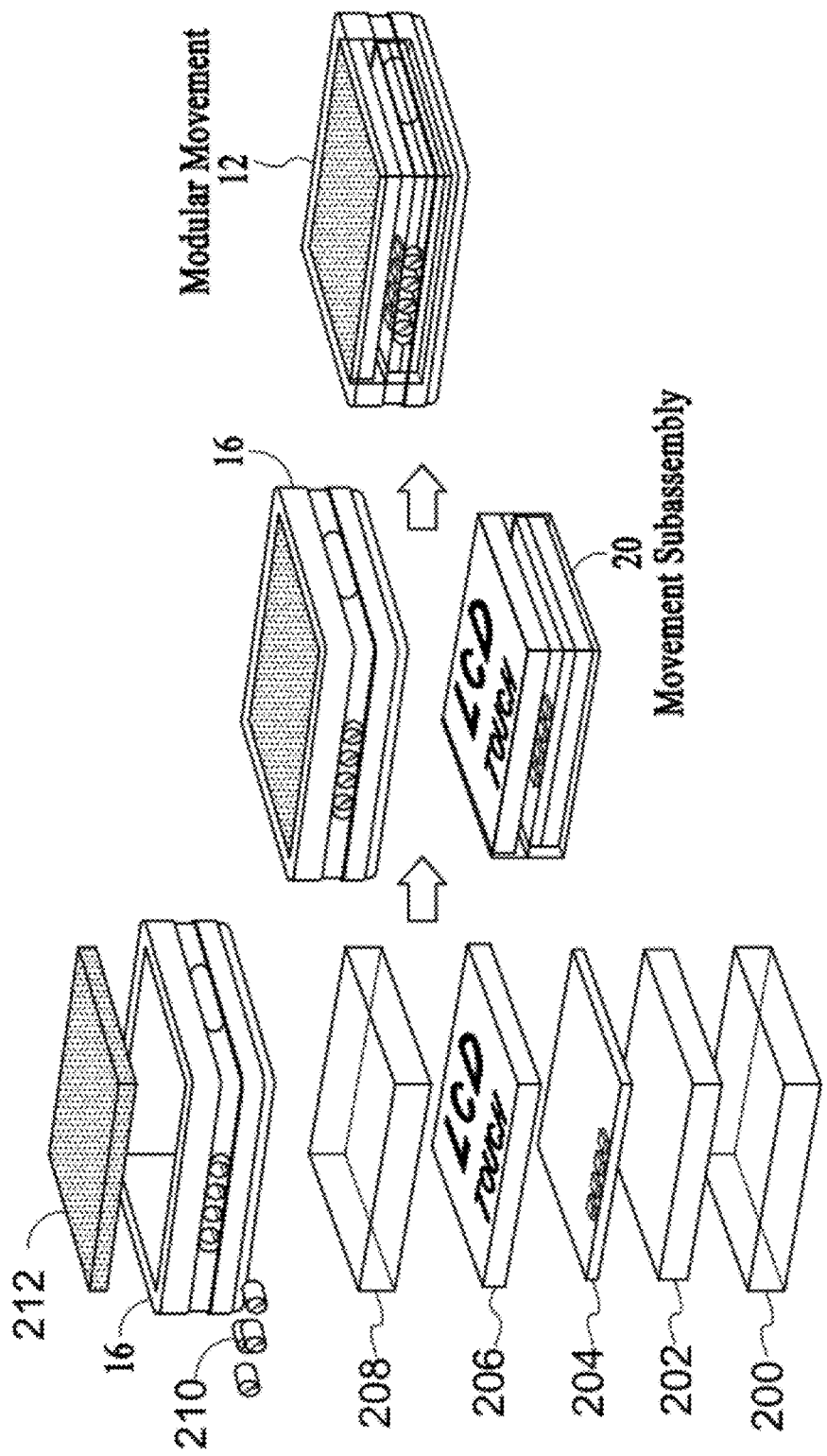
FIG. 2 is a diagram of an exploded view of the electronic device and components thereof when implemented as a computer-based electronic modular movement according to one exemplary embodiment.

FIGS. 1A-1B and 2 are block diagrams illustrating exemplary embodiments of a wearable portable device 10 (the "portable device") having a modular movement where like components have like reference numerals. The wearable portable device 10 can be wearable, for example, on a user's wrist, upper arm, and/or leg, or may be attached to the user's clothing, and may have the functions of a wristwatch, a wearable display, a portable media player, and/or a mobile telephone in various embodiments. According to the exemplary embodiments, the portable device 10 may comprise a modular movement 12 (the "module") and a case 14. The module 12 includes a body 16 that houses a plurality of layers, including an integrated display 18 (which may be touchscreen) and a movement subassembly 20, for displaying information, including time. FIG. 1A is a diagram of module 12 shown with a semitransparent body 16 for convenience so that subassembly 20 can be seen through body 16.

As used herein, the term "modular" means that the body 16 of the module 12 includes all parts necessary for operation and power of the module 12. Thus, the module 12 of the exemplary embodiment is fully functional in a standalone state. However, according to the exemplary embodiment, the case 14 of the portable device 10 includes a receptacle 22 for removably receiving the module 12 without need for a tool, such that the module 12 can be either used with the case 14 of the portable device 10 and/or is user interchangeable with the cases of other electronic devices having the same or similar types of receptacles.

The portable device 10 is shown as a wristwatch; however, various embodiments of the invention include other accessory forms. For example, some embodiments include other accessories with mounts for the module 12, such as mobile phones, computer bays, automobile mounts (e.g., dashboard mount, console mount), handheld games, media players (e.g., MP3 players), necklaces, brooches, belts, keyboards, cameras, bicycle, keychain, video camera, speaker platforms, and ankle bracelets.

In an alternative embodiment, the portable device 10 may be implemented as a stand-alone device, such as cell phone, where the functions of module 12 including the below-described gesture-based user interface, are integrated into the stand-alone device.

In one embodiment, the body 16 may be constructed to provide the module 12 with a degree of water resistance and dust protection. For example, the body 16 may be a single shell except for an opening for the display 18 and once the display 18 is in place, the display 18 may by sealed with the body 16 using traditional waterproofing methods. In another embodiment, the body 16 may be assembled in separate pieces but then sealed once assembled.

In one exemplary embodiment, the module 12 and the receptacle 22 in the case 14 are made industry standard sizes, such that different modules 12 manufactured and sold by a one set of manufacturers fit within the receptacles of different cases manufactured and sold by another set of manufacturers, for example.

FIGS. 1A and 1B show an embodiment where the receptacle 22 is formed as an opening in the back of the case 14 and where the top or front of the case 14 includes an opening. In this embodiment, the module 12 is inserted into the case 14 from the bottom or back of the case 14, and once inserted the display 18 of the module is visible through the opening in the top of the case 14. When the module 12 is used in an portable device 10, such as a watch, the display 18 of the module 12 becomes the display 18 of the portable device.

The display 18 can include a display assembly including a color LCD display, a glass overlay and a touch-sensitive overlay. The display 18 may form the top of the portable device 10 in an exemplary embodiment. The display 18 can be color, monochrome, black and white, or grayscale. The glass in the display 18 can be a number of different materials, including glass, tempered glass, quartz, plastic, soda lime glass, white soda lime glass, aluminosilicate, and/or sapphire. The glass represents a transparent barrier between the outside world and the display area that also offers a degree of scratch resistance. In some embodiments, the display includes an active viewable area of 25.4 (H)×25.4 (V) mm, with a display resolution between approximately 128 (H)×128 (V) and 200 (H)×200 (W) pixels. Other embodiments include other display resolutions. The display 18 may also include a wireless antenna for communications with, for example, a Bluetooth headset. In some embodiments the display 18 has an active area that measures less than 2.5" diagonally (in other embodiments, less than 2" diagonally).

In one embodiment, the depth or thicknesses of the module 12 and the case 14 may be designed to be substantially similar, so that when the module 12 is inserted, the side of the module 12 facing the open end of the receptacle 22 is coplanar with the back of the case 14 (and the wearer's arm), as shown in FIG. 1A. Once the module 12 is inserted into the receptacle 22, in one embodiment, no closure is necessary to seal the case 14 unlike with traditional watches.

Also, once inserted, the display 18 of the module 12 that is open through the top of the case 14 may be designed to be approximately coplanar with, slightly above, or slightly below, the top of the case 14.

As used herein, the portable device 10 may include a combination of both the case 14 and the module 12. But the term "case" 14 may denote the body of the portable device 10 into which the receptacle 22 is formed and into which the module 12 is to be inserted. Thus, for portable device 10, such as a watch, the proportionate size of the portable device/case to the receptacle 22 is small (FIGS. 1A and 1B). But for larger portable devices, the size of the portable device/case to the receptacle 22 may be larger.

According to another aspect of the exemplary embodiment, the module 12 is implemented as a computer-based electronic movement that is used to power the portable devices into which it is inserted, as described below.

FIG. 2 is a diagram of an exploded view of the module and components thereof when implemented as a computer-based electronic modular movement according to one exemplary embodiment. As shown, the module 12 includes body 16 that houses multiple layers of components, which in this exemplary embodiment, may include a plastic internal chassis 200, a rechargeable-type battery 202, a printed circuit board (PCB) 204, a touchscreen 206, and an optional second plastic internal chassis 208 and protective covering 212. In this embodiment, the module 12 has six sides, but the side with the touchscreen 206 is substantially all display area.

The PCB 204 may include components (described below) such as a memory and processor for executing software that displays a user interface on the touchscreen 206 and that operates the module 12; and an optional communications interface for receiving data remotely, which may be displayed and updated on the touchscreen 206.

Other components of the module 12 may include an antenna (not shown) that wraps around the body 16 (alternatively embedded in case 14), and a set of contacts 210 inserted into the body 16 and in contact with the PCB. The contacts may be used for recharging the battery (the contacts are both power and ground) and/or for serialized communications. The contacts can also be used for orientation purposes for the user to tell which side of the module 12 is up or down when inserting the module 12 into the receptacle 22 of the case 14. In one embodiment, the contacts 210 are located on a side of the module 12 that is in the receptacle 22 opening so that the portable device 10 as a whole can be placed in a dock and the contacts 210 used to abut the contacts of the dock. In another embodiment, the contacts 210 are located on a side of the module 12 that face inward into the receptacle 22 for abutting with contacts in the receptacle 22. In yet another embodiment, the contacts 210 may be located on the module 12 such that the contacts 210 wrap around at least two side of the module 12 to be used in both manners.

During assembly, the contacts 210 are inserted into the body 16; and the layers of components are assembled as shown into a movement subassembly 20. The movement subassembly 20 is then inserted into the body 16 and the body is sealed, creating the computer-based modular movement 12.

Figure 3:
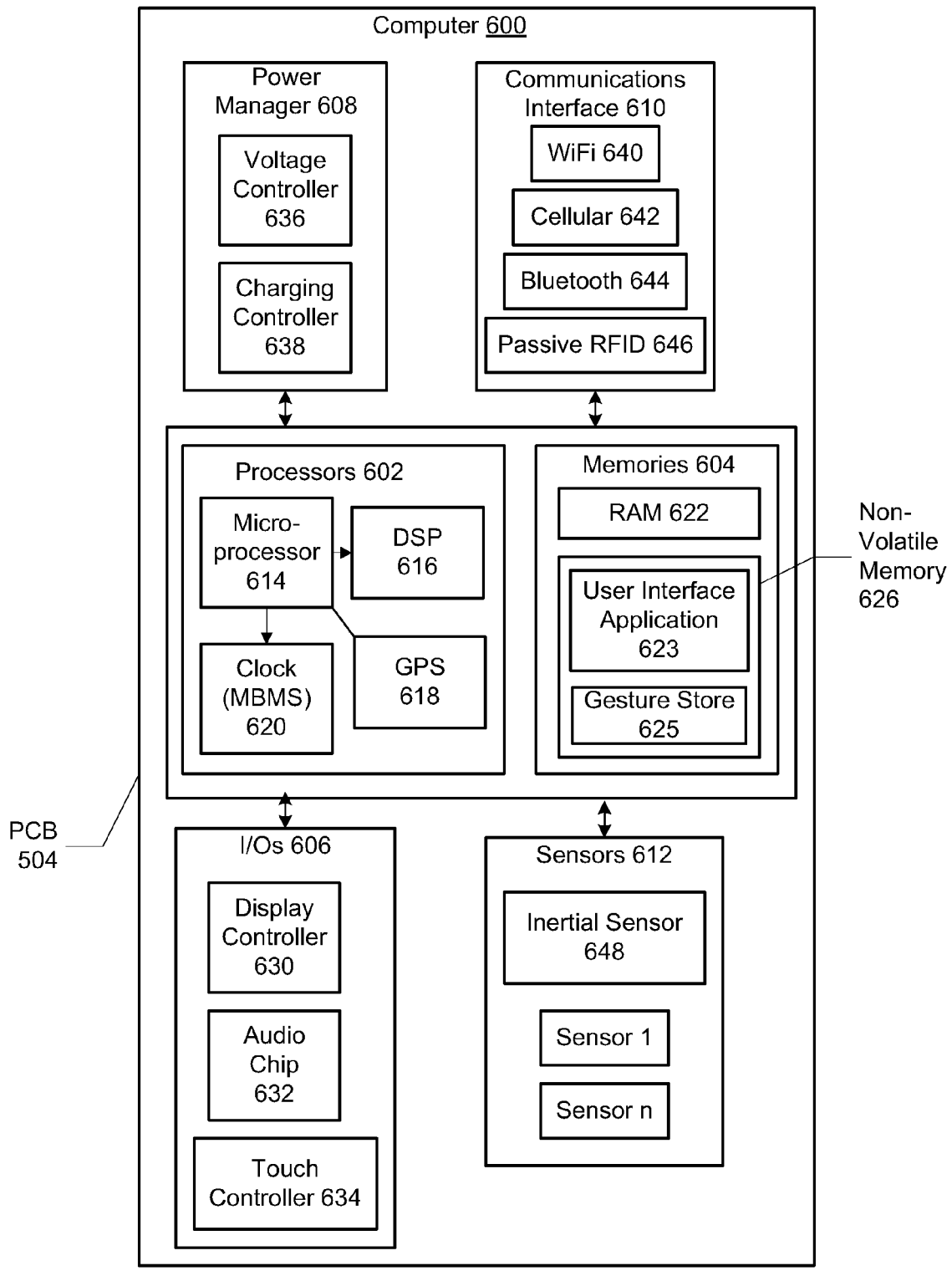
FIG. 3 is a block diagram illustrating computer components on a PCB comprising the wearable portable device that provides a gesture-based user interface according to an exemplary embodiment.

FIG. 3 is a block diagram illustrating computer components on the PCB comprising the module 12 according to an exemplary embodiment. In one embodiment, the PCB 504 containing computer 600 may be implemented as a single sided or double-sided PCB. In another embodiment, the PCB 504 may be implemented as separate PCBs and stacked within the movement subassembly 514.

Computer 600 may include components such as processors 602, memories 604, inputs/outputs 606, power manager 608, a communications interface 610, and sensors 612. In one embodiment, one or more of the components of the computer 600 may be implemented on a single chip.

The processors 602 may include at least one microprocessor 614, a digital signal processor (DSP), a global positioning chip (GPS) 616, and a clock 620. Microprocessor 614 and/or DSP may be capable of concurrently executing multiple software routines, including system code, to control the various processes of the modular movement 12. In one embodiment, microprocessor 614 may comprise an Advanced RISC Machine (ARM) processor or the like may be used, for example. GPS 618 may process received signals and with or without microprocessor 614 determine position information such as location, speed, direction, and time.

Clock 620 may be used as an internal timing device for the computer 600. Clock 620, which may also be referred to as a real-time clock or system clock, inputs to the microprocessor 614 a constant flow of timing pulses for operation of the microprocessor 614. Clock 620 may also keep track of the time of day and makes this data available to the software routines executing in microprocessor 614. In one embodiment, clock 620 comprises a silicon clock oscillator implemented using micro-electro-mechanical systems (MEMS) technology. In another embodiment, clock 620 may utilize a quartz crystal oscillator.

Memories 604 may include a random access memory (RAM) 622 and a nonvolatile memory 626. RAM 622 may be used as the main memory for microprocessor 614 for supporting execution of the software routines and other selective storage functions. Non-volatile memory 626 is capable of holding instructions and data without power and may store the software routines for controlling modular movement 12 in the form of computer-readable program instructions. In one embodiment, non-volatile memory 626 comprises flash memory. In alternative embodiments, non-volatile memory 626 may comprise any type of read only memory (ROM).

The non-volatile memory 626 may contain a user interface application 623, which can provide functionality for the portable device 10 and can output a graphical user interface on the display 18. The non-volatile memory 108 can include a gesture store 625 (e.g., a database, or a look-up table), which can contain definitions of different gestures in the form of combinations of sensor inputs, defined here as "gesture rules," and predetermined functions associated with the gestures that are executed upon identification of the gestures. When executed, the user interface application 623 can access the gesture rules stored in gesture store 625 when movement of the portable device 10 is sensed. When the movement satisfies the rules in a gesture definition, the predetermined function may be executed, as described below.

I/Os 606 may include a display controller 630, an audio chip 632, and a touchscreen controller 634. Display controller 630 may access RAM 622 and transfer processed data, such as time and date and/or a user interface, to the touchscreen 506 for display. The audio chip 632 is coupled to an optional speaker (not shown) and interfaces with microprocessor 614 to provide audio capability for the modular movement 12. In another embodiment, the audio chip 632 may be coupled to both a speaker and a microphone (not shown). In this embodiment, a water resistant/proof speaker and microphone may be used to retain water resistance of the modular movement 12. In an alternative embodiment, the modular movement 12 may be implemented without sound capability, in which case no audio chip 632, speaker or microphone is necessary.

In the embodiment where the audio chip 632 is coupled to both a speaker and microphone, the microphone may record voice input that is first processed by the audio chip and then input to the microprocessor 614 for further processing. The audio chip 632 may include hardware and/or software that converts analog voice into pulse code modulation (PCM) or Adaptive Differential PCM (ADPCM) digital code and vice versa, as well as for compressing and decompressing the PCM or ADPCM digital audio signal. In one embodiment, the processed voice input may be stored for subsequent playback. In another embodiment, the processed voice input may be transferred to communications interface 610 for wireless transmission.

Touchscreen controller 634 may interface with the touchscreen 506 to detect touches and touch locations and pass the information on to microprocessor 614 for determination of user interactions. Another example I/O 606 may include a USB controller (not shown).

Power manager 608 communicates with the microprocessor 614 and coordinates power management for the computer 600 while the computer is drawing power from the battery 502 during normal operations. In one embodiment, the battery 502 may comprise a rechargeable, lithium ion battery or the like may be used, for example. The power manager 608 includes a voltage controller 636 and a charging controller 638 for recharging the battery 502. Voltage controller 636 may regulate battery voltage to the rest of the computer 600, and charging controller 638 may manage appropriate voltage levels to properly charge the battery 502. Power manager 608 may further include a microcontroller (not shown) in one embodiment.

The communications interface 610 may include components for supporting one-way or two-way wireless communications. In one embodiment, the communications interface 610 is for primarily receiving data remotely, including streaming data, which is displayed and updated on the touchscreen 506. However, in an alternative embodiment, besides transmitting data, the communication interface 616 could also support voice transmission. In an exemplary embodiment, the communications interface 610 supports low and intermediate power radio frequency (RF) communications. The communications interface 610 may include one or more of a WiFi transceiver 640 for supporting communication with a WiFi network, including wireless local area networks (WLAN), and WiMAX; a cellular transceiver 642 for supporting communication with a cellular network; Bluetooth transceiver 644 for low-power communication according to the Bluetooth protocol and the like, such as wireless personal area networks (WPANs); and passive radio-frequency identification (RFID) 646. Others wireless options may include baseband and infrared, for example. The communications interface 610 may also include other types of communications devices (not shown) besides wireless, such as serial communications via contacts 510 and/or USB communications, for example.

The sensors 612 are representative of devices that can take information about the outside world and supply it to the device 10. The sensors 612 can also function with other components to provide user or environmental input and feedback to a user. Sensors 612 may include at least one of each of an inertial sensor 648, and any number of optional sensors 1-$n$. Inertial sensor 648 can include a MEMS accelerometer (e.g., a 3-axis accelerometer from ST Microelectronics LIS302DL) that may be used to measures information such as position, motion, tilt, shock, and vibration for use by microprocessor 614. A MEMS inertial sensor may be advantageous because it may be fabricated in a very small size (e.g., 5×5×1 millimeters), consume very little power, and still be sensitive to gestures. Because a portable device, such as a wristwatch, has a very small volume and limited battery power, MEMS sensors may be particularly suited for implementation of a gesture-based interface in a wristwatch. Another example of an inertial sensor 648 includes an accelerometer and/or a gyroscope to provide information about movement of the portable device 10.

In an exemplary embodiment, the inertial sensor 648 may be designed to have a sensitivity appropriate to detect gestures that fall within a normal range of human motions. For example, a +/−2 g or +/−3 g inertial sensor, with a bandwidth of 0.1 Hz-10 Hz, may be used to provide a desired level of sensitivity. Exemplary commercially available inertial sensors include inertial sensors marketed by Freescale Semiconductor, Inc. of Austin, Tex., Analog Devices, Inc. of Cambridge, Mass., and STMicroelectronics N.V. of Geneva, Switzerland.

The inertial sensor 648 may output a voltage signal whose magnitude is proportional to the movement sensed in an exemplary embodiment. In some embodiments, a different voltage signal may be output for each degree of freedom possessed by the inertial sensor 648. For example, if the inertial sensor 648 is a two-axis accelerometer, it can output two voltage signals, corresponding to the sensed motion in the X and Y axes. Likewise, if the inertial sensor 648 is a three-axis accelerometer, the inertial sensor 648 may output three voltage signals that correspond to the sensed motion in the X, Y, and Z axes. The inertial sensor 648 may also include a gyroscope, which may detect angular motion, and output three voltage signals corresponding to sensed angular motion in the $\phi$, $\theta$, and $\psi$ directions. The voltage signal or voltage signals may each be transmitted to the processor using one pin per voltage signal (e.g., for a three-axis accelerometer, one pin for each of the X, Y, and Z axes), or by using fewer pins. In an exemplary embodiment, a single pin may be used for transmission of all of the voltage signals. A single pin may be advantageous because it may require fewer wires and take up less space on a circuit board.

The optional sensors 1-$n$ may include environmental sensors (e.g., ambient light (e.g., TPS851 from Toshiba), temperature, humidity, pressure and/or altitude, magnetic (e.g., Hall Effect), compass, etc), biological sensors (e.g., pulse, pulse oximetry, body temperature, blood pressure, body fat, etc.), and a proximity detector for detecting the proximity of objects. Other examples of sensors include touch screen sensors, haptic sensors, and audio input. In the embodiment where the display 18 comprises a touch screen, the touch screen can be capacitance and/or resistance based, or any other touch sensitive device that provides user touch information. In one embodiment, the proximity detector may be implemented as an infrared data Association (IRDA) proximity detector. The computer 600 may display the information measured from the sensors 612, analyze the information by microprocessor 614 and display the analyzed information, and/or transmit the raw or analyzed information via the communications interface 610. In one embodiment, not all of the sensors 612 may be located on PCB 504.

In one exemplary embodiment, the computer 600 includes an inertial sensor 648, which may be a MEMS accelerometer (or other inertial sensor capable of motion tracking in at least two dimensions such as a gyroscope), an ambient light sensor, and a proximity sensor, such as an infrared sensor. According to the exemplary embodiment, the combined information from these sensors is used to provide feedback required to determine when the display 18 is visible to the user and should be turned on or off. For example, see "Gesture-Based Power Management for a Wearable Portable Electronic Device Assigned," Ser. No. 12/356,451 with a filing date of Jan. 20, 2009, assigned to the same assignee as the present application.

Figure 4:
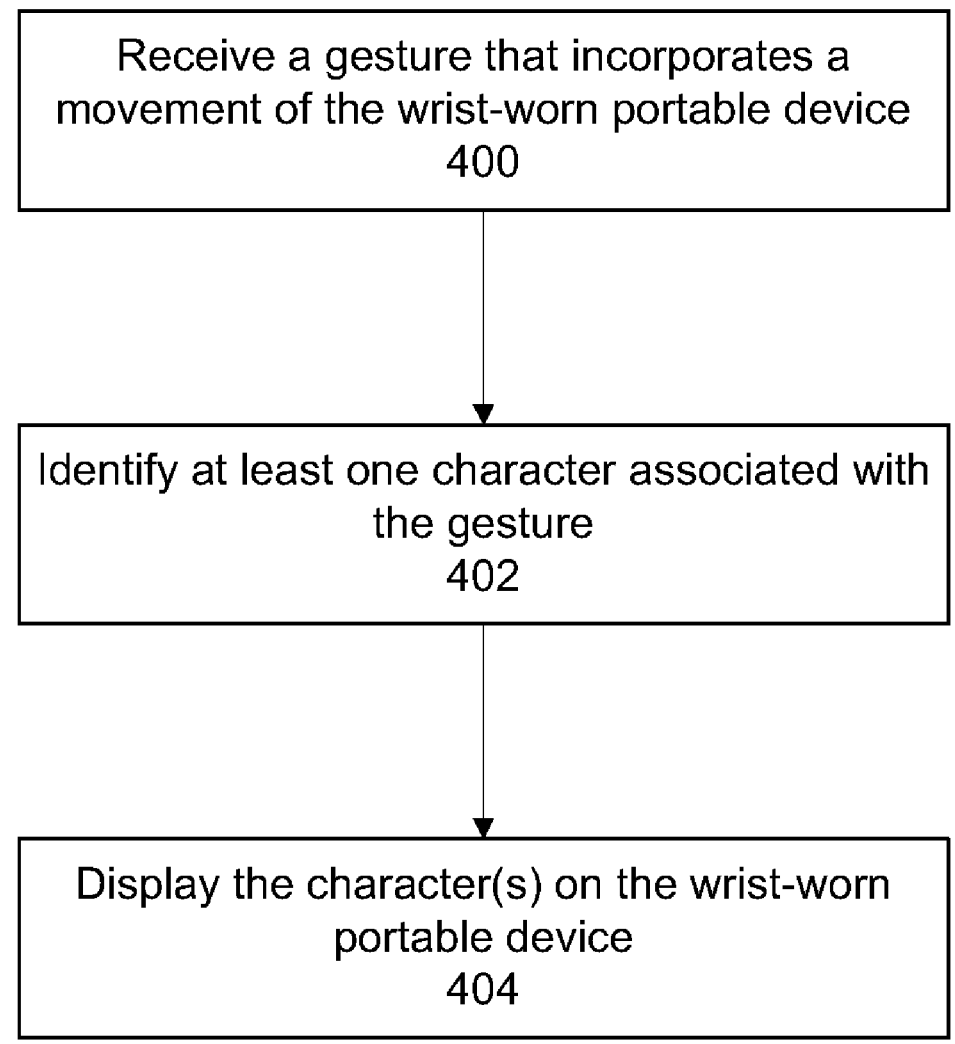
FIG. 4 illustrates an exemplary embodiment of a process for providing a gesture-based user interface for a wearable portable device.

FIG. 4 illustrates an exemplary embodiment of a process for providing a gesture-based user interface for a portable device. A gesture is received comprising a movement of the portable device 10 (block 400). The gesture, as described above, may be detected by the inertial sensor 648, and voltage signals can be output by the inertial sensor 648 to the microprocessor 614 that correspond to the gesture detected.

In an exemplary embodiment, the definition of a sensed gesture may include at least one axis of movement, a frequency, and a force magnitude. The axis of movement can be, as described above, the axes within which the movement takes place. The frequency can be the frequency of a vibration, or of a repeated movement. The force magnitude can be the g force of the force applied to the portable device 10. The definition of a gesture may further include information received from any optional sensors 1-$n$ on board the portable device 10, such as a pressure, a temperature range, a sensed light intensity, etc.

Figure 5:
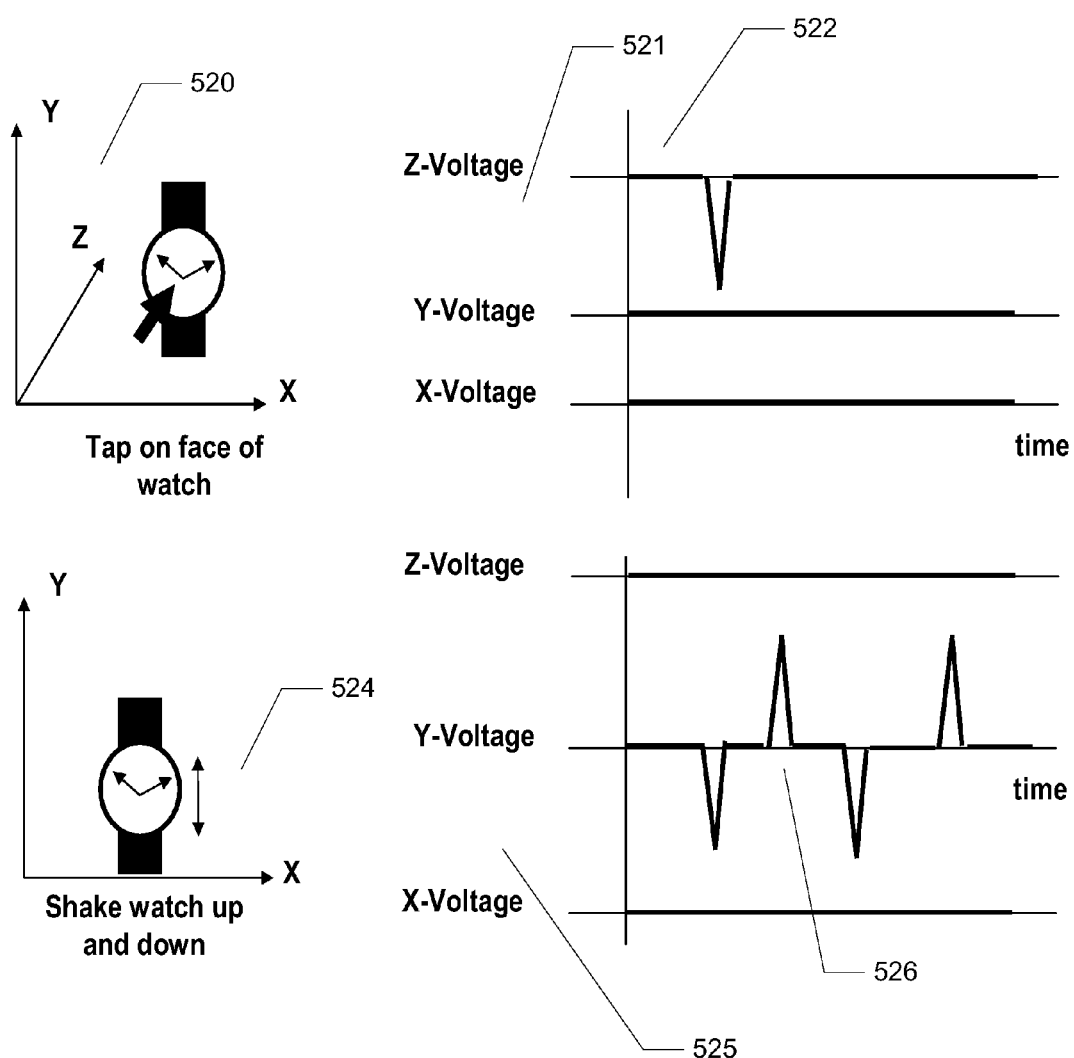
FIG. 5 illustrates exemplary embodiments of gestures and corresponding signals generated by an inertial sensor in response to the gestures.

FIG. 5 illustrates exemplary embodiments of gestures and corresponding voltage signals generated by an inertial sensor in response to gestures made by a wearer of the portable device 10. Graphs 520 and 524 display spatial representations of gestures, and graphs 521 and 525 respectively display voltage signals associated with the gestures in graphs 520 and 524. The voltage signals shown in graphs 521 and 525 are the output of the inertial sensor 648, which includes three degrees of freedom, with one degree corresponding to motion sensed in each of the X, Y, and Z directions. The voltage signals are accordingly labeled "x-voltage," "z-voltage," and "y-voltage," and when motion is sensed in one or more of the X, Y, and Z direction, a signal associated with the direction is transmitted by the inertial sensor 648 to the microprocessor 614.

Graph 520 shows an exemplary gesture, tapping the face of the portable device 10 once, which can cause mechanical vibration in the z direction. The inertial sensor 648 may detect this movement, and output a corresponding voltage signal 522 corresponding to movement in the z direction. Because there is no motion in the x or y directions, a zero value is output by the inertial sensor 648 for the x-voltage and y-voltage signals in graph 521. Diagram 524 shows another exemplary gesture, shaking the watch up and down in the y direction. Graph 524 shows that a gesture of shaking the portable device 10 up and down (y direction) may produce a corresponding oscillating signal 526 by the inertial sensor 648. Similarly, because the gesture shown in graph 524 does not contain movement in the X or Z direction, the x-voltage and z-voltage signals are zero in graph 525.

The optional sensors 1-$n$ can be used to provide information regarding a gesture that differs from the information provided by the at least one inertial sensor 648. Examples of what the optional sensors 1-$n$ can include a touch screen, an ambient light detector, a thermometer, and/or a pressure sensor. The optional sensors 1-$n$ can allow gestures to be sensed that include additional data instead of only a force applied to the portable device 10. For example a gesture may include a pressure sensed on the portable device 10. A gesture could further include sensing a temperature range, which can be triggered when a user holds the portable device 10 in his or her hand, thereby causing the temperature of the device to increase from ambient air temperature to body temperature.

Additionally, a gesture may include a sensed amount of ambient light upon the portable device 10. Gestures depending upon the amount of ambient light can, for example, cause predetermined functions to be executed on the portable device 10 when a user covers the face or display of the portable device 10 from exposure to light, or when the user places the face or display of the portable device 10 in close proximity to a light source.

Gestures may also be used to input text characters to the user interface. Referring again to FIG. 4, in response to sensing the gesture, at least one character is identified that is associated with the gesture (block 402). This can be done, for example, by the microprocessor 614, which may receive at least one signal from the inertial sensor 648 describing the gesture sensed. The identifying of the character(s) may include having the at least one signal include signal data including at least one axis of movement, a frequency, and a force magnitude and comparing the signal data with prestored signal data values associated with a plurality of characters to find at least one character associated with substantially similar prestored signal data values as the gesture. The character(s) associated with a gesture may be an alphanumeric character or characters, which may take the form, for example, of a number, a letter, a word, or a plurality of words.

Signal processing may be performed on the signal(s) by the microprocessor 614 (e.g., to remove noise from the signal(s), or to adjust the signal(s) to make subsequent analysis simpler). The signal(s) may be compared against a set of pre-established rules stored on the portable device 10 (e.g., on the non-volatile memory 626) to identify the character(s) associated with the gesture. The set of pre-established rules can describe the movement corresponding to a gesture recognized by the user interface of the portable device 10 (e.g., the amount of movement in each of the x, y, and z directions). In an exemplary embodiment, the voltage versus time output of the sensors 612 (e.g. the inertial sensor 648 and optional sensors 1-$n$) may be continuously analyzed according to a pre-determined software algorithm and compared against a set of gesture rules stored for example in gesture store 625. As described below, the rules may be customized by the user in an exemplary embodiment.

As data is received from the sensors, the data may be buffered in the non-volatile memory 626 in order to provide the microprocessor 614 with sufficient time to perform signal processing on the raw sensor output. An example of the signal processing that might be performed is data averaging, which may eliminate noise in a signal by a means of successive averaging of data points. Another example of the signal processing can be a Fourier Transform, whereby the sensor output data is mathematically converted from the time domain to the frequency domain in order to analyze the frequency content of a signal. The signal processing may enable the portable device 10 to derive signal data from the raw sensor signal, such as if the inertial sensor 648 is detecting a +/−0.5 g Y axis vibration with a frequency of 2 Hz. The signal data from the raw signal can then be compared to the gesture store 625 on a continuous basis to determine if the signal or set of signals satisfy a gesture rule.

Figure 6:
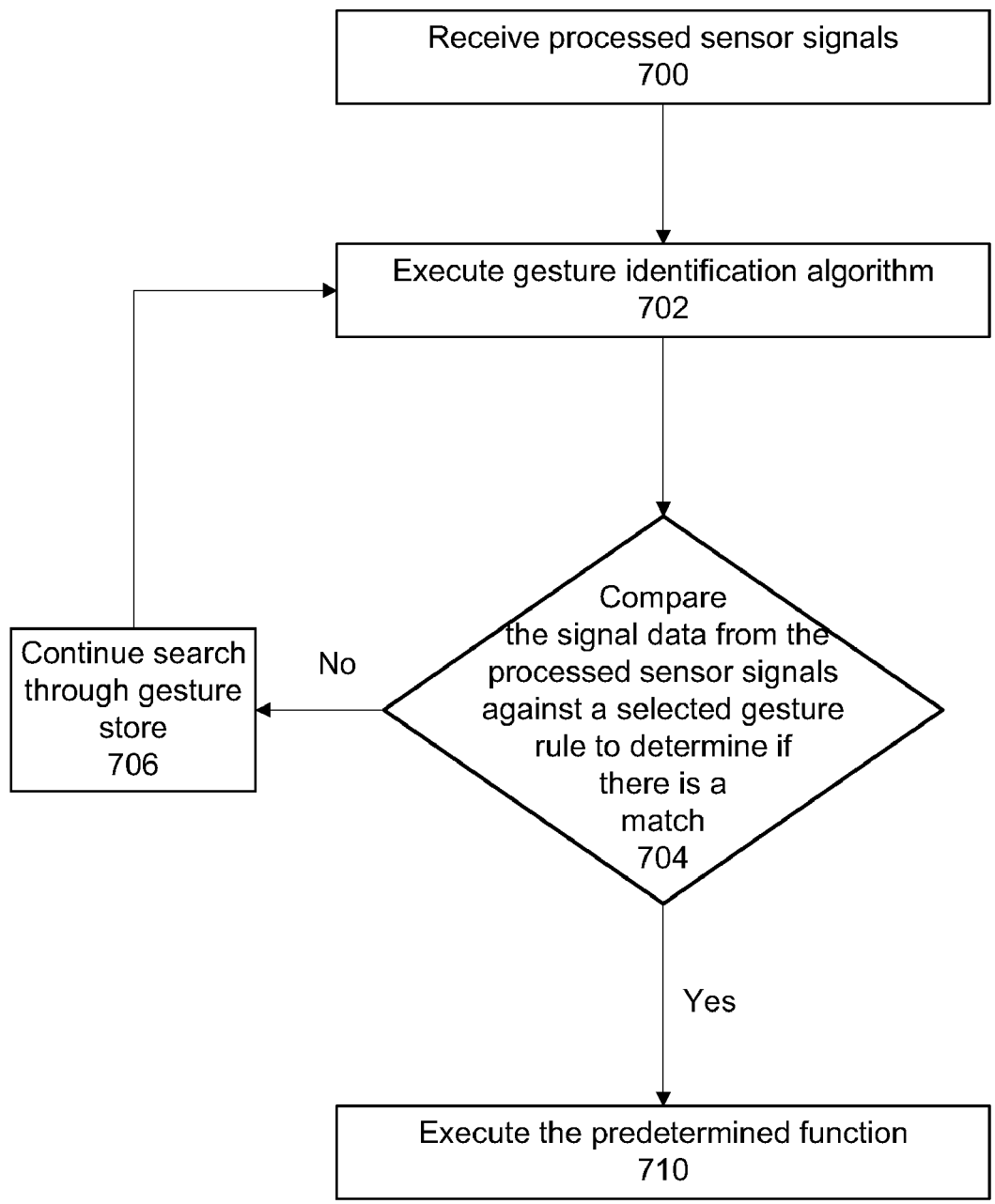
FIG. 6 illustrates an exemplary embodiment of a process for identifying a gesture.

FIG. 6 illustrates an exemplary embodiment of a process for identifying a gesture. In an exemplary embodiment, a gesture rule may include the following conditions:

Sense Axis: Y AND
Magnitude: between 0.4 and 1.0 g AND
Frequency: between 2-3 Hz AND
Ambient light sensor: Light detected Predetermined function=randomly generate a number from 1 to 6 and display the result on the wrist-watch display as an image of a gaming die The gesture store 625 may contain dozens or hundreds of gesture rules, each including a unique set of conditions. The processed signals are received (block 700), and a gesture identification algorithm is executed by the user interface application 623 (block 702). The gesture identification algorithm may compare the signal data output from signal processing against the set of gesture rules in the gesture store 625 in order to determine if the conditions for a stored gesture have been met. In the exemplary embodiment, the gesture identification algorithm compares the signal data from the processed sensor signals against a selected gesture rule to determine if there is a match (block 704). For the "Roll the Dice" exemplary gesture rule described above, it is determined if the active sense axis is the Y axis only, the magnitude is between 0.4 and 1.0 g, the frequency is between 2 and 3 Hz, and the light sensor is active.

If the processed signals do not match the conditions for the gesture rule, then the processed signals are compared against other gesture rules in the gesture store (block 706). If the signal data from the processed sensor signals meet each of the gesture rule conditions, the predetermined function is performed (block 710). In the example above, the +/−0.5 g Y axis, 2 Hz signal is identified as "roll the dice", and a number from one to six is randomly selected and displayed on the portable device 10. It may be advantageous to utilize a plurality of inertial sensors 648 and/or optional sensors 1-$n$ because a more precise set of conditions may be used to define a gesture rule. Gesture rules having more precisely defined conditions may be more unlikely to be confused with each other due to the larger number of conditions, and may also permit a larger number of gestures to be stored and utilized.

Referring to FIG. 4, after the character(s) associated with the gesture has been identified, the character(s) (corresponding to the identified gesture) are displayed on the portable device (block 404). A wide variety of possible gestures and/or gesture schemes may be used to cause characters to be displayed on the display 18 of the portable device 10. For example, to display numbers, the gesture can be tapping the portable device 10 a number of times and the character(s) displayed can be the number of times the portable device 10 is tapped. To display letters, the gesture can be tapping a message using Morse code on the portable device 10, and the character(s) displayed can be the message. In another exemplary embodiment, the gesture can be using the portable device 10 to mime (e.g., draw in the air with the wrist wearing the portable device 10) the character(s), which can be identified and displayed on the portable device 10. Allowing characters to be input to the portable device 10 in the manner described in FIG. 4 may be advantageous because it can eliminate the need for conventional devices used for character entry (e.g., buttons, a stylus or similar writing apparatus, an alphanumeric keypad, etc.). Such conventional character input devices may be ill-suited for the portable device 10 due to the small size of the display in many embodiments of the portable device 10 (e.g., a watch, a necklace, other examples described above).

As stated above, gestures may be pre-programmed into the portable device 10 and/or may be defined or reconfigured and customized by the user through use of a web-based application and/or a software tool on the portable device 10. For example, a user may prefer that the gesture "roll the dice" described above correspond to a +/−0.25 X axis, 2 Hz signal, because this motion feels more natural to them than the prior definition. The software tool and/or web service would accordingly allow the user to modify this rule in the gesture store 625.

An exemplary software tool used for defining gestures and/or the character(s) can be implemented on the portable device 10, or on a separate device in communication with the portable device 10, such as a personal computer to which the portable device 10 is docked or connected. In an exemplary embodiment, the user may change the gesture associated with a predetermined function by entering an "edit gesture" mode using the user interface application 623. The portable device 10 may then prompt the user for a gesture, and sense the received gesture. Using signal processing techniques such as those described above, signal data may be derived from a raw signal corresponding to the sensed gesture. In an exemplary embodiment, the device may prompt the user to repeat the gesture multiple times, so as to gather statistical data on the minor variations of a user's gesture and to formalize those variations in the gesture rule. The signal data may then be translated (e.g., by the software tool) into conditions that make up a new gesture rule for the predetermined function.

For example, a user could change the gesture associated with the function "Roll the Dice" from that defined above to a new gesture. The desired new gesture could be to remove the module 12 from its case 14, place it on a hard surface, and then spin the module 12 about its center axis. After the new gesture is performed, the parameters that are sensed could be:

Connection status: removed from case AND

Temperature<98 F (not in contact with the user) AND

Sense Axis $X=r^*\cos \omega t$, where $\omega$ is the rate of rotation, equal to 6.2 radians/second, and r is the magnitude of the force sensed AND Sense Axis $Y=r^*\sin \omega t$, where $\omega$ is the rate of rotation, equal to 6.2 radians/second, and r is the magnitude of the force sensed While the first two conditions are substantially unambiguous, one can easily imagine that the user will not be able to precisely spin the unit at 6.2 radians/second every time. The module 12 could then prompt the user to repeat the gesture four more times. The recorded rate of each spinning gesture may be, for example: 4, 5.2, 7, and 6.5 radians per second. The gesture rule, in an exemplary embodiment, could then be stored as:

Connection status: removed from case AND

Temperature<98 F (not in contact with the user) AND

Sense Axis $X=r^*\cos \omega t$, where $\omega$ is the rate of rotation, in the range of 4 to 7 radians/second, and r is the magnitude of the force sensed AND Sense Axis $Y=r^*\sin \omega t$, where $\omega$ is the rate of rotation, in the range of 4 to 7 radians/second, and r is the magnitude of the force sensed The new gesture rule may then be stored in the gesture store 625 for future reference as described above.

Figure 7:
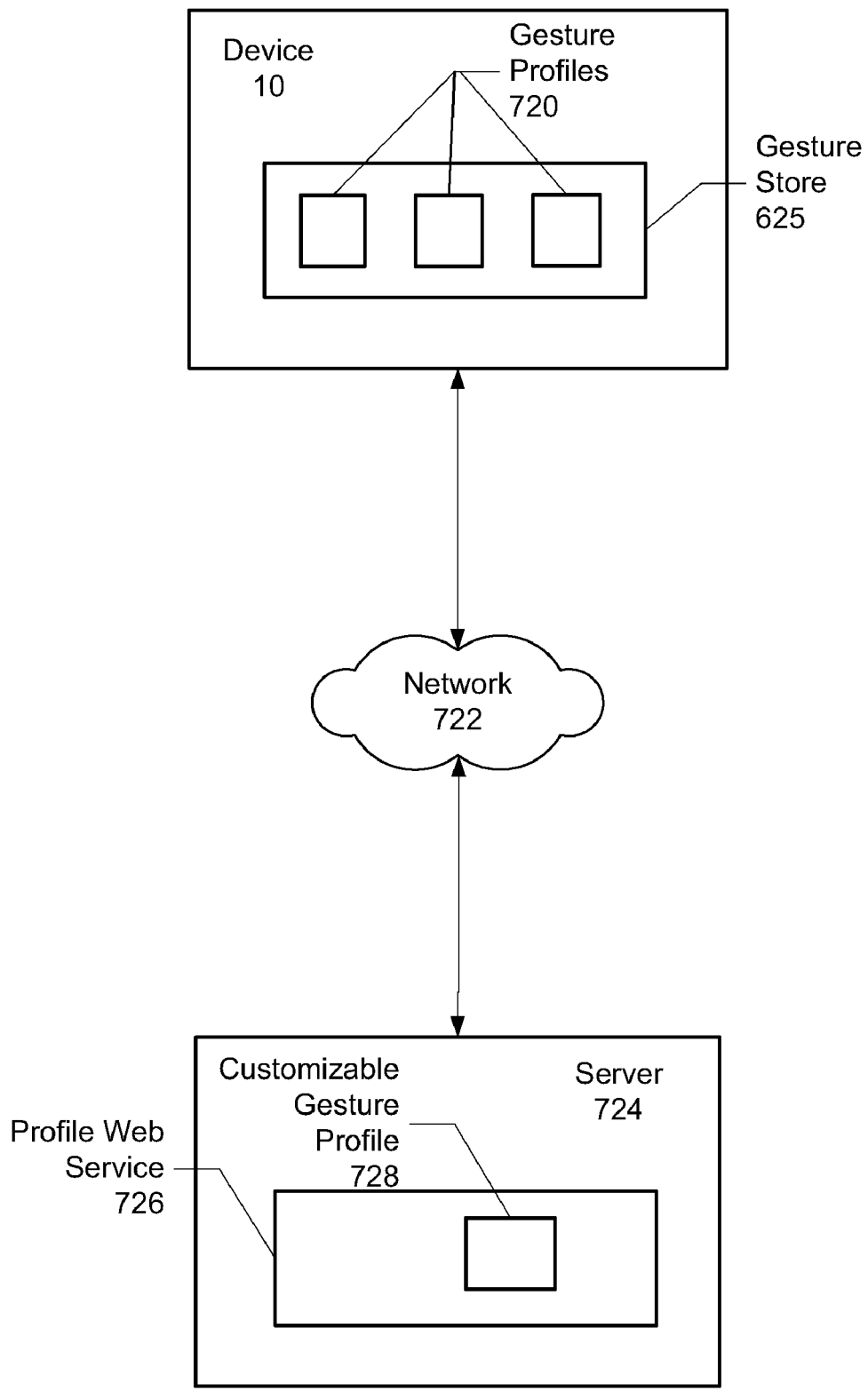
FIG. 7 is a diagram illustrating communication between an exemplary wearable portable electronic device and an exemplary profile web service including at least one customizable gesture profile for the wearable portable electronic device.

As stated above, gesture definitions may also be modified using a web service. FIG. 7 is a diagram illustrating communication between an exemplary portable device 10 and an exemplary profile web service 726 including at least one customizable gesture profile 728 for the portable device 10. In the exemplary embodiment, the gesture store 625 of the portable device 10 may include one or more gesture profiles 720. The gesture profiles 720 may include rules for one or more different gestures that can be recognized by the portable device 10. For example, an application simulating playing a game of craps can have a craps game gesture profile, which may include rules for gestures for rolling dice and placing a bet. Gesture profiles 720 may exist for each application stored on the portable device 10 in an exemplary embodiment. Gesture profiles 720 may also be used to define functionality and/or features shared by multiple applications (e.g., as part of the user interface application 623).

The portable device 10 can be in communication with a profile web service 726, which may be stored on a server 724, through a network 722. The profile web service 726 may include customizable gesture profile 728, containing at least one modified gesture. The modified gesture may differ in at least one way from the gesture rules in gesture store 625 (e.g., has different conditions, or a different predetermined function). The customizable gesture profile 728 may also contain modified settings for the gesture profiles 720 and/or gesture profiles for applications that may be downloaded to the portable device 10. The user may select the customizable gesture profile 728 from a plurality of stored profiles on the profile web service 726, or create a new one (e.g., as described above). In an exemplary embodiment, the user may enter his or her personal preferences regarding a gesture (e.g., the user's dominant hand and/or physical dimensions). A customizable gesture profile 728 may then be automatically generated based upon the entered gesture preferences. The profile web service 726 may also allow editing of existing gesture profiles or the creation of new gesture profiles in the same way as the software tool embodiment described above.

When the user identifies a customizable gesture profile 728 of interest, the user may download the customizable gesture profile 728 from the profile web service 726 to the gesture store 625. When downloaded, the customizable gesture profile 728 may exist separately from the gesture profiles 720 or it may overwrite the settings within one or more of the gesture profiles 720 in the non-volatile memory 626 of the portable device 10. The latter may be desirable, for example, when updating functionality of the user interface application 623.

In an exemplary embodiment, the portable device 10 can also include a minimum number of pre-stored gestures and associated predetermined functions to allow basic interaction with the user interface application 623 of the portable device 10. For example, sensing downward motion of the portable device 10 can be associated with a predetermined function of scrolling down a menu displayed on the user interface, and sensing upward motion of the portable device 10 can be associated with a predetermined function of scrolling up a menu displayed on the user interface. Furthermore, sensing a tap on the display 18 of the portable device 10 can correspond to the predetermined function of selecting an item displayed on the user interface that is proximate to a location on the display 18 where the tap is sensed. Sensing a tap on a side of the portable device 10 can correspond to the predetermined function of returning to a previous screen displayed on the user interface. In another example, sensing a gesture where the portable device 10 is inverted and maintained in the inverted position for one second can correspond to the predetermined function of returning to a main menu of the user interface.

In one embodiment, the gestures defined in a profile, such as the profile for the user interface application 623 can include the following.

| Gesture Name | Definition | Purpose |
| --- | --- | --- |
| TAP | Striking the display once. | Selects an item or engages a user interface button. |
| DOUBLE-TAP | Striking the display twice quickly. | Turns the portable device on. Historical back: returns the user to the previous level in the user interface hierarchy. |

-continued

| Gesture Name | Definition | Purpose |
|---|---|---|
| FLIP | Flicking a finger across about the middle of the display. | Turns pages horizontally 1-by-1. |
| SCROLL | Sliding down about the middle of the display. | Scrolls a list until the thumb or finger lets go; at which point, the list decelerates to a stop. |
| PRESS & HOLD | Pressing the display and holding the display until it changes. | Opens options and settings menus. |
| TWO-FINGER-TAP | Striking the display simultaneously in two distinct areas. | Returns the user directly to the homepage (e.g., the Clock application). |
| TRIPLE-TAP | Striking the display thrice quickly. | Returns the user directly to the homepage, (e.g., the Clock application) |

Gestures may be different and correspondingly produce different signals when performed using a user's left and right hand. Therefore, in an exemplary embodiment, the portable device 10 may, in a stored gesture rule, include conditions associated with gestures when performed with the left hand of the user, in addition to conditions associated with gestures performed with the right hand of the user. In another embodiment, the portable device 10 may automatically detect if the user is wearing the portable device 10 on the user's left hand when receiving a gesture, and may compare subsequent gestures against conditions for left-handed gestures. In another exemplary embodiment, a user can manually indicate that the user is wearing the portable device 10 on the user's left hand (e.g., entering a left-hand mode, or selecting "left hand" as the location of the portable device 10).

In addition to the basic functionality described above, gestures and associated predetermined functions can be used by different applications executed on the user interface. For example, in games involving simulated dice, the gesture received can be shaking the portable device 10 and then miming a dice-throwing motion, and the predetermined function executed can be displaying at least one dice face on the user interface. Likewise, in games involving playing cards, the gesture received may include rotating the portable device 10 by at least a predetermined angle, and the predetermined function executed can be displaying images corresponding to playing cards on the user interface.

A method and system for providing a gesture-based user interface for a portable device has been disclosed. The present invention is mainly described in terms of particular systems provided in particular implementations. However, this method and system may operate effectively in other implementations. For example, the systems, devices, and networks usable with the present invention can take a number of different forms. The present invention will also be described in the context of particular methods having certain steps. However, the method and system operate effectively for other methods having different and/or additional steps or steps in a different order not inconsistent with the present invention.

The present invention has been described in accordance with the embodiments shown, and there could be variations to the embodiments, and any variations would be within the scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Accordingly, many modifications may be made without departing from the scope of the appended claims.

We claim:

1. A method for providing a gesture-based user interface for a wearable portable device, comprising:
   storing a gesture profile for each of a plurality of different applications on the wearable portable device to define different gestures for the different applications;
   while executing one of the applications, receiving a gesture comprising a movement of the wearable portable device;
   using the gesture profile associated with the application to identify at least one of a character and a predetermined function associated with the gesture;
   in response to identifying the character, displaying the at least one character on the wearable portable device;
   in response to identifying the predetermined function, executing the predetermined function; and
   receiving a customized gesture profile downloaded to the wearable portable device that modifies the gesture, the customized gesture profile comprising personal preferences of the user regarding the modified gesture, including physical attributes of the user.

2. The method of claim 1 wherein the receiving the gesture comprises receiving a voltage signal associated with the gesture.

3. The method of claim 2 wherein identifying the at least one character comprises receiving the voltage signal, wherein the voltage signal comprises signal data comprising at least one axis of movement, a frequency, and a force magnitude of the gesture, and comparing the signal data with prestored signal data values associated with a plurality of characters to find at least one character associated with substantially similar prestored signal data values as the gesture.

4. The method of claim 1 wherein the receiving the gesture comprises sensing a number of taps on the wearable portable device and the displaying the at least one character comprises displaying the number of taps sensed.

5. The method of claim 1 wherein the receiving the gesture comprises sensing a message in Morse code tapped on the wearable portable device and the displaying the at least one character comprises displaying the sensed message in text form.

6. The method of claim 1 wherein the receiving the gesture comprises sensing use of the wearable portable device to mime the at least one character.

7. The method of claim 1 wherein the gesture is defined by a user using a software tool.

8. The method of claim 1 wherein the at least one character is defined by a user using a software tool.

9. The method of claim 1 wherein the gesture comprises sensing a tap on a side of the wearable portable device and the executing the predetermined function comprises returning to a previous screen of the user interface.

10. The method of claim 1 wherein the gesture comprises sensing inversion of the wearable portable device and maintenance of an inverted position for at least one second, and the executing the predetermined function comprises returning to a main menu of the user interface.

11. The method of claim 1 wherein the gesture comprises sensing rotating the wearable portable device by at least a predetermined angle and the executing the predetermined function comprises displaying images.

12. The method of claim 1 wherein the wearable portable device comprises a module configured to execute the method of claim 1.

13. The method of claim 1 further comprising deriving the first signal data from a raw signal describing the gesture, wherein identifying at least one character comprises comparing the signal data to a plurality of gesture rules in a gesture store on a continuous basis to find a match.

14. The method of claim 13 wherein the gesture rules comprise conditions associated with a gesture performed with a left hand of a user, in addition to conditions associated with a gesture performed with a right hand of the user.

15. A wearable -portable device having a gesture-based user interface, comprising:
   an inertial sensor;
   a display;
   a memory that stores a gesture profile for each of a plurality of different applications on the wearable portable device to define different gestures for the different applications;
   a processor; and
   a user interface application executing on the processor, wherein the user interface application is configured to:
      while executing one of the applications, receive at least one signal from the inertial sensor corresponding to a sensed gesture comprising a movement of the wearable portable device;
      compare the at least one signal against the gesture profile associated with the application to identify at least one of a character and a predetermined function associated with the sensed gesture;
      in response to identifying the character, display the at least one character on the display;
      in response to identifying the predetermined function, execute the predetermined function; and
      receive a customized gesture profile downloaded to the wearable portable device that modifies the gesture, the customized gesture profile comprising personal preferences of the user regarding the modified gesture, including physical attributes of the user.

16. The wearable portable device of claim 15 wherein the at least one signal comprises at least one axis of movement, a frequency, and a force magnitude.

17. The wearable portable device of claim 15 wherein the at least one signal has a magnitude that is proportional to sensed movement.

18. The wearable portable device of claim 15 wherein the at least one signal comprises two voltage signals corresponding to a movement in the X and Y axes.

19. The wearable portable device of claim 15 wherein the at least one signal comprises three voltage signals corresponding to a movement in the X, Y, and Z axes.

20. The wearable portable device of claim 15 wherein the inertial sensor senses angular motion, and the at least one signal correspond to angular motion in the $\phi$, $\theta$, and $\psi$ directions.

21. An executable software product stored on a computer-readable medium containing program instructions for providing a gesture-based user interface for a wearable portable device, the program instructions for:
   storing a gesture profile for each of a plurality of different applications on the wearable portable device to define different gestures for the different applications;
   while executing one of the applications, receiving a gesture comprising a movement of the wearable portable device;
   using the gesture profile associated with the application to identify at least one of a character and a predetermined function associated with the gesture;
   in response to identifying the character, displaying the at least one character on the wearable portable device;
   in response to identifying the predetermined function, executing the predetermined function; and
   receiving a customized gesture profile downloaded to the wearable portable device that modifies the gesture, the customized gesture profile comprising personal preferences of the user regarding the modified gesture, including physical attributes of the user.

22. A wearable portable electronic device having a gesture-based user interface, comprising:
   a case; and
   a module, wherein the module is configured to be removably received by the case and comprises:
      an inertial sensor
      a display;
      a memory that stores a gesture profile for each of a plurality of different applications on the wearable portable device to define different gestures for the different applications; and
      a processor, wherein the processor is configured to:
         while executing one of the applications, receive at least one signal from the inertial sensor corresponding to a sensed gesture comprising a movement of the wearable portable device;
         compare the at least one signal against the gesture profile associated with the application to identify at least one of a character and a predetermined function associated with the sensed gesture;
         in response to identifying the character, display the at least one character on the display;
         in response to identifying the predetermined function, execute the predetermined function; and
         receive a customized gesture profile downloaded to the wearable portable device that modifies the gesture, the customized gesture profile comprising personal preferences of the user regarding the modified gesture, including physical attributes of the user.

23. A method for providing a gesture-based user interface for a wearable portable device, comprising:
   receiving from a first sensor a first signal associated with a gesture comprising a movement of the wearable portable device;
   sensing from a second sensor a second signal associated with at least one of a pressure on the wearable portable device, a temperature range, and an amount of light upon the wearable portable device;
   using both the first signal and the second signal, identifying at least one of a character and a predetermined function associated with the gesture;
   in response to identifying the character, displaying the at least one character on the wearable portable device; and
   in response to identifying the predetermined function, executing the predetermined function.

24. A wearable portable device having a gesture-based user interface, comprising:
   an inertial sensor;
   a second sensor;
   a display;
   a processor; and
   a user interface application executing on the processor, wherein the user interface application is configured to:
      receive at least one signal from the inertial sensor corresponding to a sensed gesture comprising a movement of the wearable portable device;
      sense from the second sensor a second signal associated with at least one of a pressure on the wearable portable device, a temperature range, and an amount of light upon the wearable portable device;
      compare both the at least one signal and the second signal against a set of pre-established rules to identify at least one of a character and a predetermined function associated with the sensed gesture;
in response to identification of the character, display the at least one character on the display; and
in response to identification of the predetermined function, execute the predetermined function.

* * * * *